US006636464B1

(12) United States Patent
Lee et al.

(10) Patent No.: US 6,636,464 B1
(45) Date of Patent: Oct. 21, 2003

(54) OPTICAL PICKUP DEVICE CAPABLE OF DETECTING STABLE ERROR SIGNAL

(75) Inventors: Yong-jae Lee, Suwon (KR);
Pyong-yong Seong, Seoul (KR);
Jang-hoon Yoo, Seoul (KR);
Byung-ryul Ryoo, Suwon (KR);
Yong-ki Son, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 688 days.

(21) Appl. No.: 09/588,224

(22) Filed: Jun. 6, 2000

(30) Foreign Application Priority Data

Jun. 18, 1999 (KR) .......................... 1999-22917

(51) Int. Cl.[7] .............................................. G11B 7/00
(52) U.S. Cl. ................................. 369/44.23; 369/112.07
(58) Field of Search ........................ 369/44.23, 112.12, 369/112.15, 103, 44.41, 112.01, 112.07, 44.32, 112.05, 112.03, 44.27, 53.37, 112.17, 44.29, 44.25, 53.23, 94, 44.11

(56) References Cited

U.S. PATENT DOCUMENTS

| 4,983,017 A | * | 1/1991 | Tsuji et al. .................. 359/566 |
| 5,144,131 A | * | 9/1992 | Opheij et al. ............... 250/202 |
| 5,270,996 A | * | 12/1993 | Ono ....................... 369/112.12 |
| 5,278,401 A | | 1/1994 | Takishima et al. |
| 5,638,352 A | | 6/1997 | Yang |
| 5,737,296 A | | 4/1998 | Komma et al. |
| 5,754,503 A | * | 5/1998 | Senba et al. ............. 369/44.23 |

FOREIGN PATENT DOCUMENTS

| EP | 0 317 224 A | 5/1989 |
| EP | 1 003 158 A | 5/2000 |
| JP | 11110803 | 7/1999 |

OTHER PUBLICATIONS

"Offsetfreie Spurfolgerengelung Fur Eine Optische Abtasteininrichtung", Neues Aus Der Technik, DE, Vogel Verlag K.G. Wurzburg, No. 4, Dec. 20, 1990, p. 5.

* cited by examiner

Primary Examiner—Thang V. Tran
Assistant Examiner—Kimlien T. Le
(74) Attorney, Agent, or Firm—Burns, Doane, Swecker & Mathis, LLP

(57) ABSTRACT

An optical pickup device employing a signal detection unit including a hologram element having a plurality of pattern regions for diffracting and/or focusing light reflected and incident from a recording medium, a photodetector having a plurality of light receiving regions for receiving and photoelectrically converting the light diffracted by the hologram element and a signal operation unit for generating a focus error signal and/or a track error signal from a signal detected from the photodetector. The optical pickup device can implement a stable servo operation even at deviations of the photodetector, a change in the wavelength of light emitted from the light source, and/or shift of focusing means such as an objective lens, and can record and/or reproduce high-density information on/from the recording medium.

19 Claims, 5 Drawing Sheets

$PP1 = D + E \sin(wt)$ $PP2 = D' + E' \sin(wt)$ $PP = (k_1 E - k_2 E') \sin(wt)$

OPTICAL PICKUP DEVICE CAPABLE OF DETECTING STABLE ERROR SIGNAL

BACKGROUND OF THE INVENTION

1. Field of the Invention

The present invention relates to an optical pickup device, and more particularly, to an optical pickup device configured to detect a stable error signal by reducing offsets even when the focusing means such as an objective lens is shaken, there is deviation in a photodetector and/or there is a change in the temperature.

2. Description of the Related Art

In a high-capacity recording and/or reproducing optical pickup device, focus and/or track error signals must be detected in order to perform a stable servo function. Typically, an optical pickup device includes a light source, an objective lens for focusing a beam emitted from the light source onto the recording plane of a disk, and a signal detection unit for detecting an information signal and an error signal from light reflected from the disk and passed through the objective lens.

In the case of an optical pickup device configured to detect a focus error signal by an astigmatic method, the signal detection unit has an optical arrangement as shown in FIG. 1. Referring to FIG. 1, beams reflected from a disk (not shown) are focused by a sensing lens 2 via an objective lens (not shown) and are received in a photodetector 6 via an astigmatic lens 4 for producing astigmatism. The photodetector 6 has four light receiving regions A, B, C and D arranged in a 2×2 matrix.

When the signals detected from the respective light receiving regions A, B, C and D of the photodetector 6 are referred to as the same characters, respectively, a radio frequency signal RFS is obtained by summing the signals detected from the light receiving regions A, B, C and D, as represented by formula (1):

$$RFS = (A+B+C+D) \quad (1)$$

A focus error signal FES is obtained by summing the signals detected from the diagonally opposite light receiving regions, i.e., A+C and B+D, and then obtaining a difference between the sums, as represented by formula (2):

$$FES = (A+C) - (B+D) \quad (2)$$

A track error signal TES based on a push-pull method is obtained by summing the signals detected from the light receiving regions parallel to the track direction, i.e., A+D and B+C, and then obtaining a difference between the sums.

$$TES = (A+D) - (B+C) \quad (3)$$

In the case of recording/reproducing on/from a high-density recording/reproducing disk, e.g., a DVD-RAM disk, which adopts a land/groove recording type, using an optical pickup device having the conventional signal detection unit, even at an on-focus state, there is severe cross talk in a focus error signal based on an astigmatic method, due to the effect by neighboring tracks. Thus, the optimal positions of focuses of land/groove differ.

Further, since the conventional signal detection unit has a small-sized light spot formed on a photodetector, a focus error signal and a track error signal are sensitive to deviation of the photodetector. Accordingly, focus offset and track offset, in which the focus error signal and the track error signal become a value other than zero at an on-focus and on-track positions, may occur.

Also, the wavelengths of light emitted from a light source are changed according to changes in the temperature. Thus, if chromatic aberration occurs to focusing means, for example, an optical element such as an objective lens (In most optical elements, an increase in the wavelength reduces the refractive index.), focus offset, in which the focus error signal have a value other than zero, occurs even at an on-focus state.

Also, if an objective lens is shifted from its original place by a seek or a disk eccentricity, beams are shifted on a photodetector. Thus, an offset occurs to a push-pull signal.

SUMMARY OF THE INVENTION

To solve the above problems, it is an object of the present invention to provide an optical pickup device free from offset in a track error signal by shaking of focusing means such as an objective lens, by which high-density recording/reproduction is allowed, and the optical pickup device free from offset in a focus error signal by deviation of a photodetector and/or a change in the temperature, by which a stable error signal can be detected.

To achieve the above object, there is provided an optical pickup device including: a first light source for generating and emitting light; first light path changing means for changing a traveling path of incident light; focusing means for focusing the incident light from the light path changing means onto a recording medium; and a first signal detection unit having a hologram element for diffracting incident light after being reflected from the recording medium, a photodetector for receiving the light diffracted by the hologram element and converting the same into an electrical signal and a signal operation unit for generating a focus error signal and/or a track error signal from a detection signal of the photodetector, the signal detection unit for receiving the light reflected from the recording medium and then passed through the focusing means and the first light path changing means, wherein the hologram element includes first and second pattern portions arranged to be spaced apart a predetermined distance from each other, for diffracting and focusing incident light, and third and fourth pattern portions arranged close to the first and second pattern portions, respectively, for diffracting incident light in different directions, the first and second pattern portions being provided such that ±1st-order diffracted beams are focused on first and second focuses, respectively, and wherein the photodetector includes first and second light receiving units positioned between the first and second focuses in an on-focus state, for receiving the light diffracted and focused by the first and second pattern portions, and third and fourth light receiving units for receiving the light diffracted by the third and fourth pattern portions.

Here, the first pattern portion preferably includes first and second pattern regions, the second pattern portion includes third and fourth pattern regions facing the first and second pattern regions, respectively, one diffracted beam among ±1st-order diffracted beams diffracted by the first and fourth pattern regions is focused on the first focus and the other diffracted beam is focused on the second focus, and one diffracted beam among ±1st-order diffracted beams diffracted by the second and third pattern regions is focused on the second focus and the other diffracted beam is focused on the first focus.

In this case, the first light receiving unit may include first and second sectional light receiving regions each of which forms a bisectional light receiving region for receiving one diffracted beam among the ±1st-order diffracted beams diffracted by the first pattern region, and third and fourth sectional light receiving regions each of which forms a bisectional light receiving region for receiving one diffracted beam among the ±1st-order diffracted beams diffracted by the second pattern region; and the second light receiving unit includes fifth and sixth sectional light receiving regions each of which forms a bisectional light receiving region for receiving one diffracted beam among the ±1st-order diffracted beams diffracted by the third pattern region, and seventh and eighth sectional light receiving regions each of which forms a bisectional light receiving region for receiving one diffracted beam among the ±1st-order diffracted beams diffracted by the fourth pattern region.

Preferably, the bisectional light receiving regions are sectioned substantially parallel to each other, and the second and eighth sectional light receiving regions and fifth and third sectional light receiving regions are disposed inward with respect to the first and seventh sectional light receiving regions and the sixth and fourth sectional light receiving regions, respectively.

The signal operation unit detects a focus error signal by obtaining a difference between the sum signal of detection signals of the first, third, fifth and seventh sectional light receiving regions and the sum signal of detection signals of the second, fourth, sixth and eighth sectional light receiving regions.

Also, the first light receiving unit may further include first and second single light receiving regions for receiving another diffracted beams diffracted by the first and second pattern regions, and the second light receiving unit may further include third and fourth single light receiving regions for receiving another diffracted beams diffracted by the third and fourth pattern regions.

The third and fourth pattern portions are provided between and/or outside the first and second pattern portions.

Here, the space between the first and second pattern portions and the widths of the first and second pattern portions are optimized so as to suppress offsets of a track error signal against the movement of focusing means of the optical pickup device.

In order to detect a push-pull signal without a direct-current (DC) component offset, the signal operation unit preferably includes a first differential unit for obtaining the difference between the detection signals of the first and second light receiving units, a second differential unit for obtaining the difference between the detection signals of the third and fourth light receiving units, first and second amplifiers for amplifying output signals of the first and second differential units into predetermined gain levels, and a third differential unit for obtaining the difference between the signals input from the first and second amplifiers, wherein the gains of the first and second amplifiers satisfy the condition of the DC component offset in the differential signal of the third differential unit being removed.

BRIEF DESCRIPTION OF THE DRAWINGS

The above object and advantages of the present invention will become more apparent by describing in detail a preferred embodiment thereof with reference to the attached drawings in which.

DESCRIPTION OF THE PREFERRED EMBODIMENTS

Figure 8:
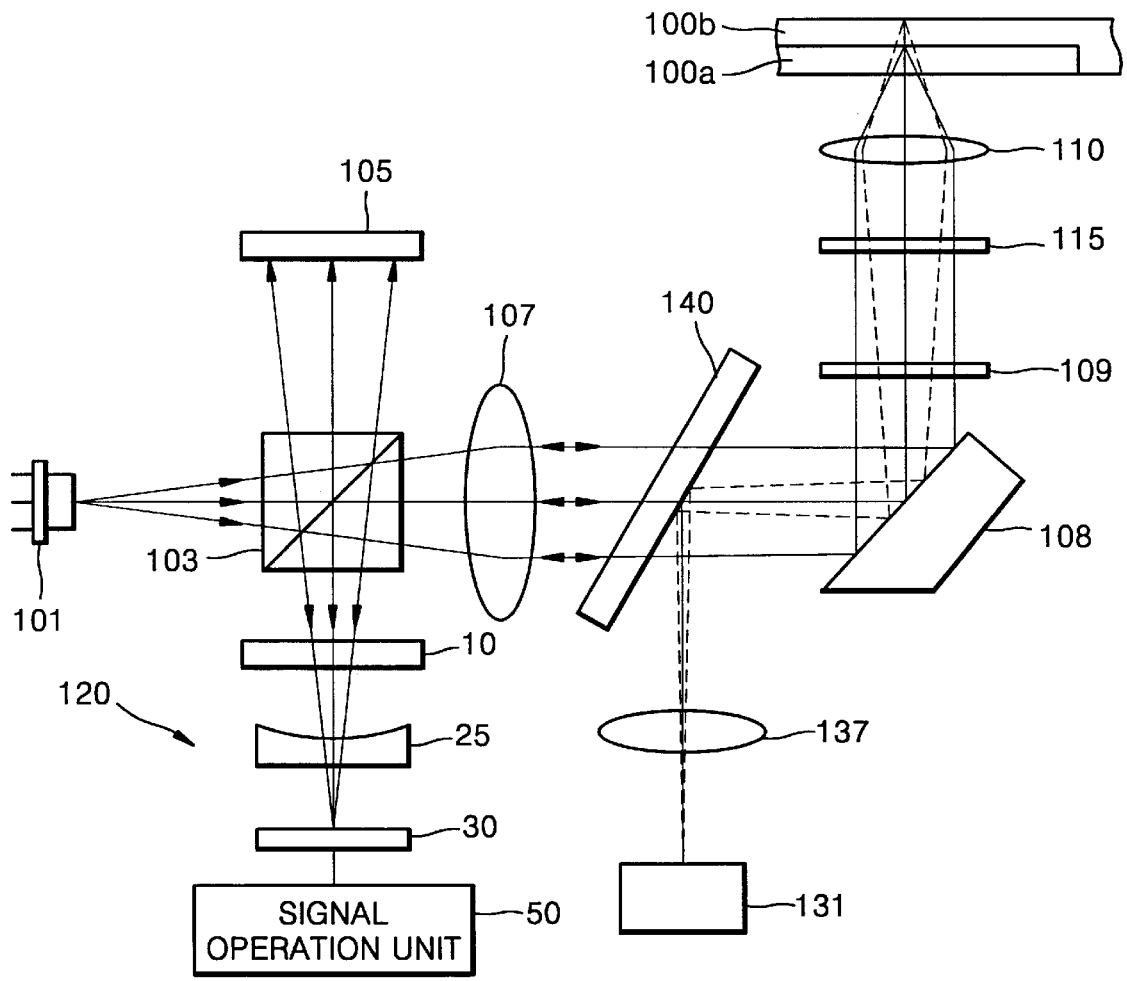
FIG. 8 shows an embodiment of an optical pickup device employing the signal detection unit according to the present invention.

A signal detection unit according to the present invention employed in an optical pickup device as shown in FIG. 8, receives light irradiated from a light source and reflected from a recording medium, e.g., a disk, and detects a focus error signal and/or a track error signal, so that an optical pickup device records/reproduces an information signal while tracing the correct track position of a recording medium. Also, the signal detection unit can detect the information signal during reproduction.

Figure 1:
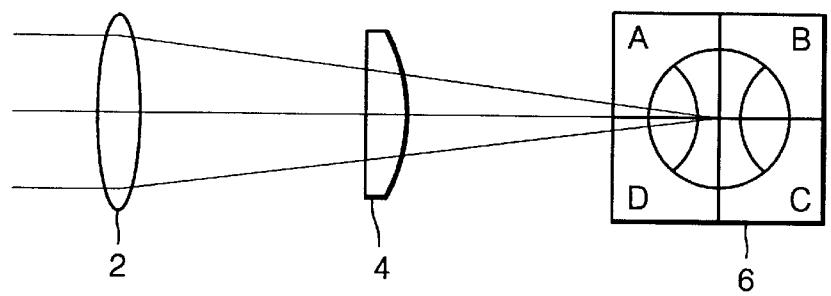
FIG. 1 is a schematic view illustrating a conventional signal detection unit for an optical pickup device.
Figure 2:
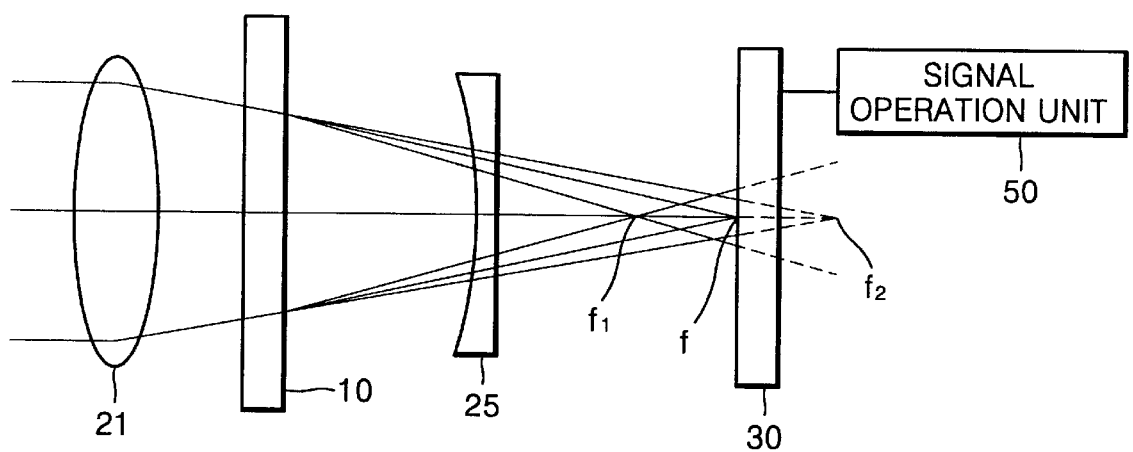
FIG. 2 is a schematic view illustrating a signal detection unit according to the present invention.
Figure 3:
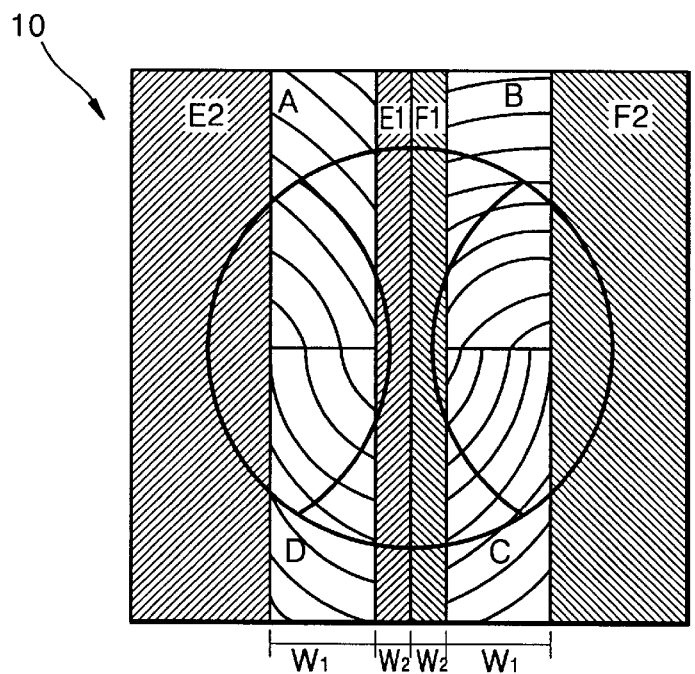
FIG. 3 is a plan view schematically illustrating a hologram element according to the present invention.

Referring to FIGS. 2 and 3, the signal detection unit according to the present invention includes a hologram element 10 for diffracting converged light which has been reflected and incident from a recording medium (not shown), a photodetector 30 for receiving the light diffracted by the hologram element 10 and converting the same into an electrical signal, and a signal operation unit 50 for generating an information signal and/or an error signal from the signal detected from the photodetector 30. Here, reference numeral 21 denotes a light sensing lens for focusing light reflected from the recording medium and incident into the signal detection unit.

The hologram element 10 includes first and second pattern portions arranged to be spaced apart a predetermined distance from each other, for diffracting and focusing the incident light, and third and fourth pattern portions arranged around the first and second pattern portions, for diffracting the incident light in different directions.

Preferably, the first pattern portion includes first and second pattern regions A and D, and the second pattern portion consists of third and fourth pattern regions B and C which face the first and second pattern regions A and D, respectively. Here, the boundary between the first and second pattern regions A and D and the boundary between the third and fourth pattern regions are on substantially the same line, and the widths $W_1$ of the pattern regions A, B, C and D are substantially the same. Thus, the pattern regions A, B, C and D are arranged clockwise in a 2×2 matrix arrangement.

The third pattern portion includes a pattern region E1 arranged between the first and second pattern portions to be closer to the first pattern portion, and a pattern region E2 arranged in the outer side of the first pattern portion to face the pattern region E1. Likewise, the fourth pattern portion includes a pattern region F1 arranged between the pattern region E1 and second pattern portion, and a pattern region F2 arranged at the outer side of the second pattern portion to face the pattern region F1. Here, the pattern regions of the third and fourth pattern portions may be provided either between the first and second pattern portions or at the outer side thereof.

As a result, the hologram element 10 of the present invention includes at least six pattern regions, that is, pattern regions A, B, C and D for diffracting and focusing incident light in different directions, and at least two pattern regions E1/E2 and F1/F2 arranged between the pattern regions A, B, C and D, or at the outer side thereof, for diffracting incident light. Thus, these pattern regions A, B, C, D, E1/E2 and F1/F2 divide the incident light into at least six parts to then diffract the same to ±1st-order beams, respectively.

Here, the hologram patterns formed in the first through fourth pattern regions A, B, C and D are arranged at predetermined angles with respect to one another so as to diffract the incident light in different directions. At least some of the pattern regions have different pitches so as to diffract the incident light at different diffraction angles. The pattern pitch of the hologram patterns formed on the respective pattern regions A, B, C and D, the diffraction angles of incident light and the diffraction directions, which are dependent on the arrangement direction thereof, are optimized to reduce offsets of error signals in consideration of the arrangement of light receiving regions of the photodetector 30 to be described later.

Figure 4:
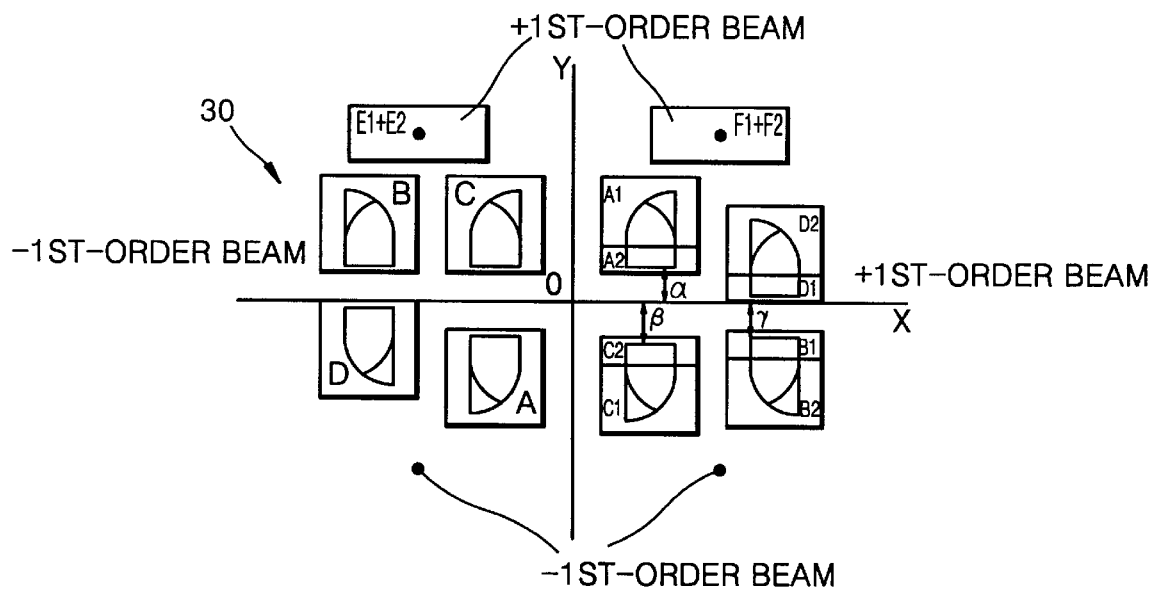
FIG. 4 is a plan view schematically illustrating a photodetector according to the present invention.

In detail, the hologram patterns are formed in the first and second pattern regions A and D to diffract incident light so that ±1st-order diffracted beams are positioned substantially on the quadrant I of the coordinate system shown in FIG. 4 and −1st order diffracted beams are positioned substantially on the quadrant III. The hologram patterns are formed in the third and fourth pattern regions B and C to diffract the incident light so that ±1st-order diffracted beams are positioned substantially on the quadrant IV of the coordinate system and −1st-order diffracted beams are positioned substantially on the quadrant II. Here, the patterns of the respective pattern regions A, D, B and C are arranged such that combinations of diffraction directions between the beams diffracted by the respective pattern regions A, D, B and C and the X-axis do not cause focus offsets even when the wavelengths of light emitted from a light source of the optical pickup device are changed due to a change in the recording mode or a change in the temperature.

In other words, if the temperature is changed, the wavelength of light emitted from a light source is changed. Accordingly, the refractive indices of at least some of optical elements, e.g., focusing means, are changed to shift the positions of focuses of diffracted beams, thereby causing an offset to a focus error signal. Also, if the wavelength of light emitted from a light source is changed due to a change in the temperature, the diffraction angles of the beams diffracted by the hologram element 10 are changed, thereby causing an offset to a focus error signal. Thus, as shown in FIG. 4, the pattern direction of the pattern regions A, B, C and D is appropriately designed so that the position of a beam landing on the photodetector 30 is optimized. In such a manner, the values of α, β and Y which are spacing distances between the beams and the X-axis, are optimized, thereby eliminating the offset of the focus error signal. In detail, α, β, and Y are the shortest distances between the X-axis and the beam spots received in bisectional light receiving regions A1/A2, bisectional light receiving regions C1/C2 and bisectional light receiving regions B1/B2 to be described later.

The first and fourth pattern regions A and C are provided to diffract incident light and to be served as a lens having negative (−) power with respect to a diffracted beam, e.g., a +1st-order diffracted light, and having positive (+) power with respect to another diffracted beam, e.g., a −1st-order diffracted beam. The second and third pattern regions D and B are provided to diffract incident light and to be served as a lens having positive (+) power with respect to a diffracted beam, e.g., a +1st-order diffracted light, and having negative (−) power with respect to another diffracted beam, e.g., a −1st-order diffracted beam.

In this case, the −1st-order diffracted beam diffracted by the first and fourth pattern regions A and C and the +1st-order diffracted beam diffracted by the second and third pattern regions D and B have relatively short focal distances to then be focused on a first focus $f_1$. Also, the +1st-order diffracted beam diffracted by the first and fourth pattern regions A and C and the −1st-order diffracted beam diffracted by the second and third pattern regions D and B have relatively long focal distances to then be focused on a second focus $f_2$ which is farther than the first focus $f_1$ in view of a recording medium.

Here, in the case of an on-focus state, the photodetector 30 is positioned between the first and second focuses $f_1$ and $f_2$, preferably in the middle thereof, so that the first and second focuses $f_1$ and $f_2$ are positioned in the front and rear of the photodetector 30, as will be described later. Thus, at the on-focus state, the sizes of light spots of the ±1st-order beams diffracted by the first through fourth pattern regions A, D, B and C, which are received in the photodetector 30, are substantially the same, as shown in FIG. 4.

Here, the first through fourth pattern regions A, D, B and C divide the incident light and diffract only the incident light received in the respective regions. Thus, the light spots of the ±1st-order diffracted beams are in inverted images and have the same shape, as shown in FIG. 4.

The pattern regions E1/E2 and F1/F2 of the third and fourth pattern portions, unlike the first and second pattern portions, just serve to diffract the incident light in different directions. Thus, the +1st-order diffracted beams diffracted by the pattern regions E1/E1 and F1/F2 are preferably focused onto a focus f which is the center of the first and second focuses $f_1$ and $f_2$ in an on-focus state. This is also applicable to the −1st-order diffracted beams.

Here, in the hologram element 10 of the present invention, the distance between the first and second pattern portions, preferably the widths $W_2$ of the pattern regions E1 and F1 of the third and fourth pattern portions positioned between the first and second pattern portions and the widths $W_1$ of the first and second pattern portions are optimized so as to suppress offsets of a track error signal against the movement of focusing means of the optical pickup device. Here, since the widths of the pattern regions E1 and F1 of the third and fourth pattern portions are the same, the hologram element 10 has a substantially symmetrical structure in view of the central axis between the third and fourth pattern portions.

Also, a focus adjusting lens 25, for example, a concave lens, is preferably further provided between the hologram element 10 and the photodetector 30. The focus adjusting lens 25 is preferably arranged between the hologram element 10 and the first focus $f_1$, and serves to change the focal distance, for example, to increase the focal distance. Thus, the degree of freedom in installing the photodetector 30 can be increased by adopting the focus adjusting lens 25.

According to the present invention, the photodetector 30 is positioned on the focus f onto which the diffracted beams by the third and fourth pattern portions are focused in an on-focus state. The photodetector 30 includes first and second light receiving units for receiving the light diffracted by the first and second pattern portions and then focused, and third and fourth light receiving units for receiving the light diffracted by the third and fourth pattern portions, as shown in FIG. 4.

The first light receiving unit includes a pair of bisectional light receiving regions A1/A2 and D1/D2 for receiving the +1st-order diffracted beam among the +1st-order diffracted beams diffracted by the first and second pattern regions A and D. The second first light receiving unit includes a pair of bisectional light receiving regions B1/B2 and C1/C2 for receiving the +1st-order diffracted beam among the ±1st-order diffracted beams diffracted by the third and fourth pattern regions B and C. For the sake of convenience in explanation, the pattern regions and the light receiving regions in which the beams diffracted by the pattern regions are received are denoted by the same reference symbols.

In a preferred embodiment of the present invention, the bisectional light receiving regions A1/A2, D1/D2, B1/B2 and C1/C2 are arranged in such a manner as shown in FIG. 4. In other words, the bisectional light receiving regions A1/A2 and D1/D2, and the bisectional light receiving regions B1/B2 and C1/C2 are substantially arranged on the quadrants I and IV, respectively, in terms of the design of the respective pattern regions A, B, C and D of the hologram element 10. Here, the bisectional light receiving regions D1/D2 are close to the X-axis. Also, the bisectional light receiving regions A1/A2, B1/B2, C1/C2 and D1/D2 are partitioned to be substantially parallel such that the partition lines are parallel to the X-axis. The sectional light receiving regions A2, C2, B1 and D1 are closer to the X-axis than sectional light receiving regions A1, C1, B2 and D2. In other words, the sectional light receiving regions A2 and C2 are disposed inward with respect to the sectional light receiving region A1 and C1, and the sectional light receiving regions B1 and D1 are disposed inward with respect to the sectional light receiving regions B2 and D2.

The detection signals of the bisectional light receiving regions A1/A2, B1/B2, C1/C2 and D1/D2 are mainly used in detecting a focus error signal, as will be described later, and can also be used in detecting a track error signal and an information signal.

The first and second light receiving units preferably further include single light receiving regions A and D for receiving the −1st-order diffracted beams among the ±1st-order diffracted beams diffracted by the pattern regions A and D, and single light receiving regions B and C for receiving the −1st-order diffracted beams among the ±1st-order diffracted beams diffracted by the pattern regions B and C. Here, the single light receiving regions A and D are positioned on the quadrant III to be symmetrical to the bisectional light receiving regions A1/A2 and D1/D2, with respect to the origin 0 of the coordinate system shown in FIG. 4. Likewise, the single light receiving regions B and C are positioned on the quadrant II to be symmetrical to the bisectional light receiving regions B1/B2 and C1/C2.

The detection signals of the single light receiving regions A, B, C and D are mainly used in detecting an information signal and can also be used in detecting a track error signal.

The third light receiving unit includes a light receiving region E1+E2 positioned on the quadrant II so as to receive +1st-order diffracted beams diffracted by the pattern regions E1 and E2 of the third pattern portion, and the fourth light receiving unit includes a light receiving region F1+F2 positioned on the quadrant I so as to receive +1st-order diffracted beams diffracted by the pattern regions F1 and F2 of the fourth pattern portion. Here, the third and fourth light receiving units may be provided to receive −1st-order diffracted beams diffracted by the third and fourth pattern portions.

Since the photodetector 30 is disposed substantially in the middle of the first and second focuses $f_1$ and $f_2$, that is, the focus f, in an on-focus state, the shapes and sizes of the light spots of the diffracted beams received in the bisectional light receiving regions A1/A2, B1/B2, C1/C2 and D1/D2 and the single light receiving regions A, B, C and D are substantially the same in an on-focus state. Also, the light spots are focused on the light receiving regions E1+E2 and F1+F2 of the third and fourth light receiving units.

The signal operation unit 50 detects the track and/or focus error signals from the detection signals of the photodetector 30. The signal operation unit 50 also detects an information signal during reproduction.

According to the present invention, the signal operation unit 50 is preferably provided so as to selectively detect a push-pull signal or a differential phase signal according to a recording/reproduction mode or the types of recording media to then detect a track error signal. Here, the track error signal is detected by different methods according to a recording/reproduction mode or the types of recording media.

For example, during recording/reproduction of a DVD-ROM disk or reproduction of a DVD-R/RW disk, the signal operation unit 50 compares a sum signal of the single light receiving regions A and C in which the diffracted beams by the diagonally opposite pattern regions A and C of the hologram element 10 are received, with phase signals of the single light receiving regions B and D in which the diffracted beams by the other diagonally opposite pattern regions B and D are received, thereby producing a differential phase signal. Here, it is also possible to produce a differential phase signal by comparing phase signals of the detection signals of the corresponding bisectional light receiving regions. In this case, since the differential phase signal is produced by comparing the phases of the detection signals, offsets are minimized.

During recording/reproduction of a DVD-RAM disk or reproduction of a DVD-R/RW disk, the signal operation unit 50 operates to detect the push-pull signal.

Here, the signal operation unit 50 can also detect the push-pull signal without an offset even when focusing means such as an objective lens is shifted from the original place due to a seek or eccentricity of a disk-type recording medium, and the principle thereof will now be described.

Figure 6A:
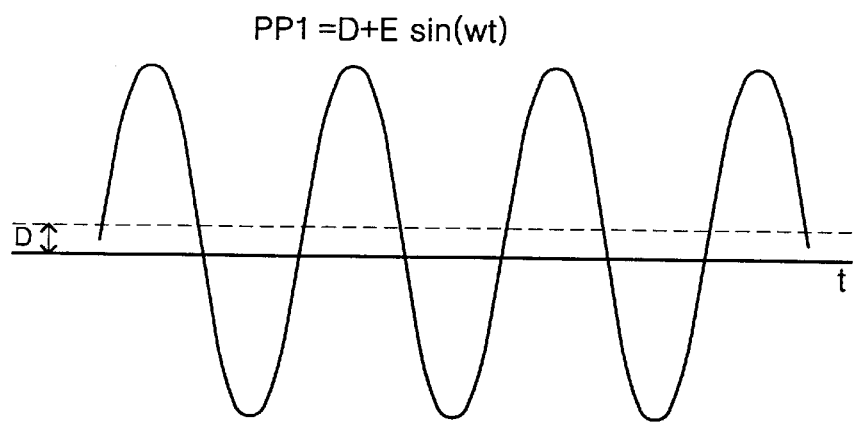
FIGS. 6A through 6C illustrate PP1, PP2 and PP signals of FIG. 5.
Figure 6B:
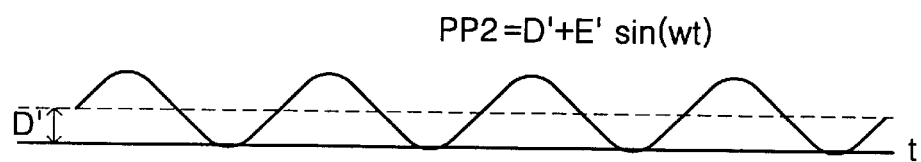

When the focusing means is shifted, the offset of a push-pull signal occurs mainly at a central portion of beams, that is, portions of the pattern regions E1 and F1 into which the beams are incident, and a peripheral portion of beams, that is, portion of the pattern regions E2 and F2 into which the beams are incident. Thus, if the hologram element 10 is formed to have appropriate values of the widths $W_2$ of the pattern regions E1 and F1 and the widths $W_1$ of the pattern regions A and $B_1$ the push-pull signal PP1 (PP1=a+d-b-c) from the pattern regions A, D, B and C has a relatively large amount of alternating-current (AC) components and a small amount of offsets of direct-current (DC) components, compared to the push-pull signal PP2 (PP2=e1+e2−f1−f2) from the pattern regions E1/E2 and F1/F2, as shown in FIG. 6A. Conversely, as shown in FIG. 6B, the PP2 signal has a small amount of AC components and a large amount of offsets of DC components compared to the PP1 signal. Thus, the PP1 signal and the PP2 signal are separately detected, respectively multiplied by appropriate coefficients and then the difference between the two signals is obtained, thereby producing a push-pull signal without an offset even at the movement of the focusing means.

Figure 5:
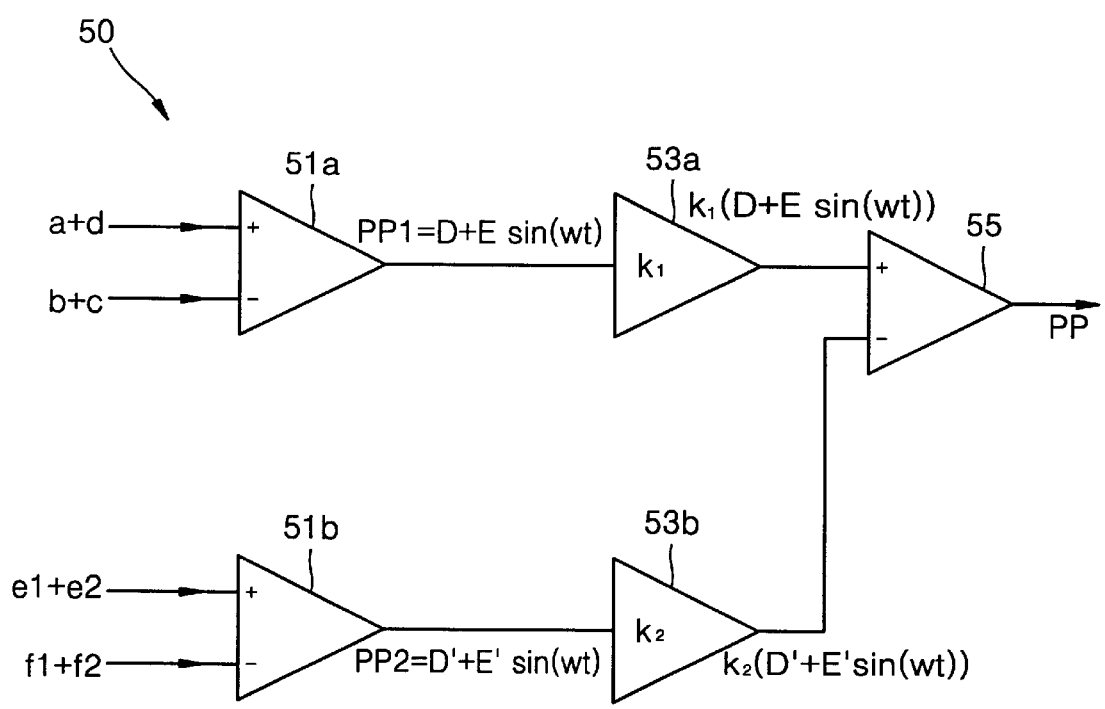
FIG. 5 illustrates an embodiment of a push-pull signal detection part of a signal operation unit shown in FIG. 2.

In a detailed embodiment of the present invention, the portion of the signal operation unit 50, where the push-pull signal is detected, is constituted by a first differential unit 51a for obtaining a difference between the detection signals of the first and second light receiving units, a second differential unit 51b for obtaining a difference between the detection signals of the third and fourth light receiving units, first and second amplifiers 53a and 53b for amplifying output signals of the first and second differential units 51a and 51b into predetermined gain levels, and a third differential unit 55 for obtaining a difference between the signals input from the first and second amplifiers 53a and 53b, as shown in FIG. 5.

The detection signal of the first light receiving unit, preferably, the sum signal a+d of the detection signals a and d of the single light receiving regions A and D, is applied to a positive (+) input port, and the detection signal of the second light receiving unit, preferably, the sum signal b+c of the detection signals b and c of the single light receiving regions B and C, is applied to a negative (−) input port. Alternatively, the sum signal $a_1+a_2+d_1+d_2$ of the detection signals $a_1$, $a_2$, $d_1$ and $d_2$ of the bisectional light receiving regions A1/A2 and D1/D2 and the sum signal $b_1+b_2+c_1+c_2$ of the detection signal $b_1$, $b_2$, $c_1$ and $d_2$ of the bisectional light receiving regions B1/B2 and C1/C2 may be applied to the first differential unit 51a.

The output signal of the first differential unit 51a, that is, PP1 which equals D+Esin(wt), has an offset D, as shown in FIG. 6A. The output signal of the first differential unit 51a is amplified into a gain level $k_1$ by the first amplifier 53a to then be applied to the positive (+) input port of the third differential unit 55.

On the other hand, the detection signals e1+e2 and f1+f2 of the light receiving regions E1+E2 and F1+F2 of the third and fourth light receiving units are applied to positive (+) and negative (−) input ports of the second differential unit 51b, and the output signal of the second differential unit 51b, that is, PP2 which equals D'+E' sin(wt), has an offset D', as shown in FIG. 6B. Likewise, the output signal of the second differential unit 51b is amplified into a gain level $k_2$ by the second amplifier 53b to then be applied to the negative (−) input port of the third differential unit 55.

Thus, the output signal of the third differential unit 55 can be represented by the following formula (4):

$$(k_1D-k_2D')+(k_1E-k_2E')\sin(wt) \qquad (4)$$

Figure 6C:
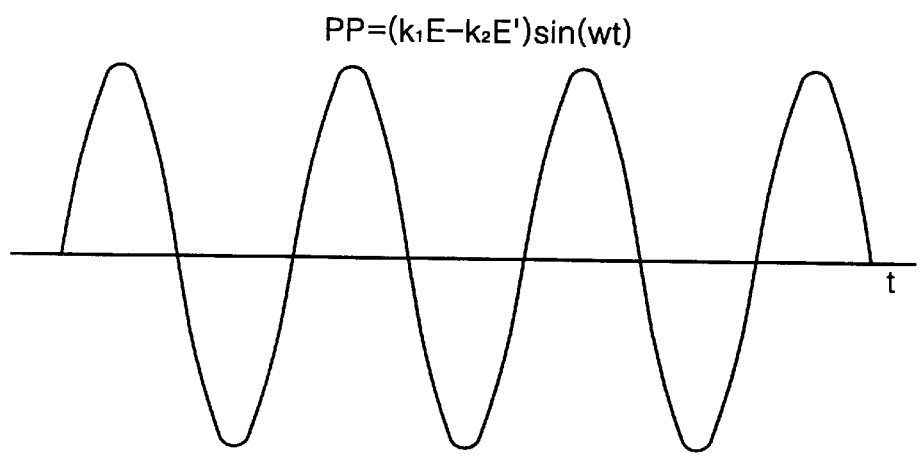

If the gain levels $k_1$ and $k_2$ satisfy the condition that the DC component in the formula (4), that is, the offset, equals zero, as represented by the formula (5), an offset-removed push-pull signal PP is output from the third differential unit 55, as represented by the formula (6). FIG. 6C is a graph showing the offset-removed push-pull signal PP.

$$k_1D-k_2D'=0 \qquad (5)$$

$$PP=(k_1E-k_2E')\sin(wt) \qquad (6)$$

The signal operation unit 50 according to the present invention detects a focus error signal as follows.

The signal operation unit 50 obtains differences between the detection signals of the respective bisectional light receiving regions A1/A2, B1/B2, C1/C2 and D1/D2 and then sums the differences, thereby detecting the focus error signal. In the case of beams diffracted by the first and fourth pattern regions A and C, the detection signals $a_2$ and $c_2$ of the sectional light receiving regions A2 and C2 arranged to be close to the X-axis are subtracted from the detection signals a, and $c_1$ of the sectional light receiving regions A1 and C1 arranged to be far from the X-axis. In the case of beams diffracted by the second and third pattern regions D and B, the detection signals $b_2$ and $d_2$ of the sectional light receiving regions B2 and D2 arranged to be far from the X-axis are subtracted from the detection signals b, and $d_1$ of the sectional light receiving regions B1 and D1 arranged to be close to the X-axis. Then, the results are summed. Thus, the focus error signal FES can then be represented by the following formula (7):

$$FES=(a_1+b_1+c_1+d_1)-(a_2+b_2+c_2+d_2) \qquad (7)$$

wherein, in an on-focus state, $a_1=a_2$, $b_1=b_2$, $c_1=c_2$ and $d_1=d_2$ so that the focus error signal FES becomes zero. This result can be obtained by appropriately designing the position of the sectional boundary lines of the bisectional light receiving regions and the distance therebetween in view of the hologram element 10, or by appropriately amplifying the detection signals of the respective sectional light receiving regions in the signal operation unit 50.

When the distance between the recording medium and the focusing means is smaller than the focal distance of the focusing means, the focuses of beams diffracted by the hologram element 10 move backward. Thus, the light spots of beams received in the bisectional light receiving regions A1/A2 and C1/C2 become larger and the light spots of beams received in the bisectional light receiving regions B1/B2 and D1/D2 become smaller. Thus, the focus error signal FES becomes greater than zero.

When the distance between the recording medium and the focusing means is greater than the focal distance of the focusing means, the focuses of beams diffracted by the hologram element 10 move forward. Thus, the light spots of beams received in the bisectional light receiving regions A1/A2 and C1/C2 become smaller and the light spots of beams received in the bisectional light receiving regions B1/B2 and D1/D2 become larger. Thus, the focus error signal FES becomes smaller than zero.

As described above, the hologram element 10 of the present invention divides incident light received in some of the patterns regions a, d, b and c to then independently diffract the same and focuses the diffracted beams onto different focuses. Thus, the focuses of the diffracted beams are shifted according to the distance between the recording medium and the focusing means so that the sizes of the light spots of the beams received in the photodetector 30 are changed, thereby detecting a focus error signal.

Here, in the signal detection unit according to the present invention, since the light receiving areas of the bisectional light receiving regions A1/A2, D1/D2, B1/B2 and C1/C2 are larger than the light spots of beams received therein, deterioration of the focus error signal due to deviation of the photodetector 30 is smaller than in the conventional case. Also, even when the photodetector 30 is deviated, a focus error signal having minimized offset is detected as follows.

With respect to deviations of the photodetector 30 is deviated in the X-axis direction, since the bisectional light receiving regions A1/A2, D1/D2, B1/B2 and C1/C2 are sectioned in a direction parallel to the Y-axis, an offset is not generated.

With respect to deviations of the photodetector 30 in the Y-axis direction, in an on-focus state, for example, in the +Y direction, the differences in the detection signals between the bisectional light receiving regions A1/A2 and C1/C2 are such that $a_1-a_2=-S$ and $c_1-c_2=S$, and the differences in the detection signals between the bisectional light receiving regions B1/B2 and D1/D2 are such that $b_1-b_2=-T$ and $d_1-d_2=T$. Therefore, the focus error signal becomes zero, that is, $(a_1-a_2)+(c_1-c_2)+(b_1-b_2)+(d_1-d_2)=-S+S-T+T=0$, so that an offset is not generated. Also, with respect to deviations of the photodetector 30 in the direction opposite to the above, that is, in the −Y direction, an offset is not generated because of reverse counterbalancing.

Also, the signal detection unit according to the present invention can detect a focus error signal having minimized offset during a recording operation or when the wavelength of the light emitted from a light source is changed.

Figure 7:
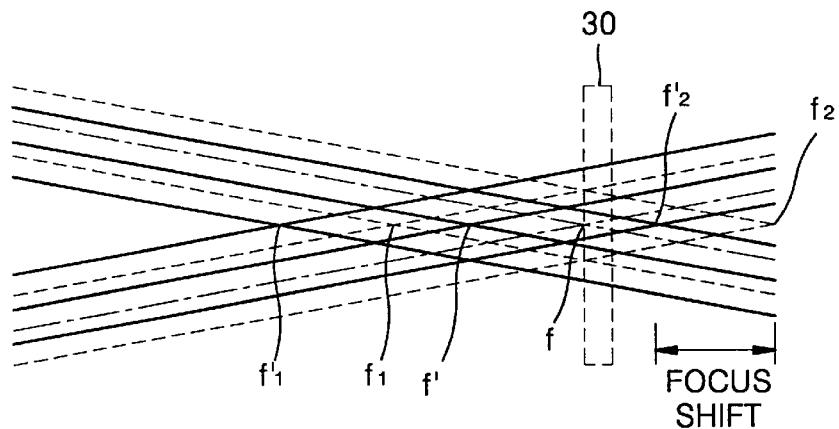
FIG. 7 shows the change in focus positions of diffracted light in the signal detection unit according to the present invention, when recording is performed or when the wavelengths of light emitted from a light source are changed according to a change in the temperature.

For example, if the wavelength increases compared to that during the adjustment for the assembly of an optical element, the refractive index of the optical element changes. In view of the overall optical system ranging from the light source and the photodetector 30, the focuses $f_1$, f and $f_2$ of the beams diffracted by the hologram element 10 are shifted toward to the focus adjusting lens 25 in an on-focus state to then be turned into $f_1'$, f' and $f_2'$, as shown in FIG. 7.

When a change in the diffraction angle of the ±1st-order diffracted beams received in the photodetector 30 is not considered, the focuses are moved toward the focus adjusting lens 25 in an on-focus state, so that the sizes of the light spots formed on the bisectional light receiving regions A1/A2 and C1/C2 become smaller. Thus, the detection signals are such that $a_1<a_2$ and $c_1<c_2$. The sizes of the light spots formed on the bisectional light receiving regions B1/B2 and D1/D2 become larger. Thus, the detection signals are such that $b_1<b_2$ and $d_1<d_2$. Therefore, the focus error signal FES becomes smaller than zero, that is, $(a_1+b_1+c_1+d_1)-(a_2+b_2+c_2+d_2)<0$, thereby generating an offset.

However, the light received in the photodetector 30 is the ±1st-order diffracted beams diffracted by the hologram element 10 and the diffraction angle θ of the diffracted beams is related to the wavelength λ such that $\sin\theta=\lambda/p$ (Here, p is the pitch of each pattern region of the hologram element 10.). Thus, if the wavelength λ becomes longer, then the diffraction angle θ increases. Thus, the ±1st-order diffracted beams received in the bisectional light receiving regions A1/A2, B/B2, C1/C2 and D1/D2 are shifted to be distant from the origin 0 shown in FIG. 4. Here, the +1st-order diffracted beams received in the bisectional light receiving regions A1/A2 and C1/C2 are shifted from the sectional light receiving regions A2 and C2 toward the sectional light receiving regions A1 and C1, that is, in the direction in which an offset generated due to the focus shift toward the focus adjusting lens 25 is decreased.

Likewise, the +1st-order diffracted beam received in the bisectional light receiving region B1/B2 is shifted from the sectional light receiving region B1 toward the sectional light receiving region B2, that is, in the direction in which an offset generated due to the focus shift is increased. Also, the +1st-order diffracted beam received in the bisectional light receiving region D1/D2 is shifted from the sectional light receiving region D1 toward the sectional light receiving region D2, that is, in the direction in which an offset generated due to the focus shift is increased.

Thus, as shown in FIG. 4, if the pattern is formed such that the absolute angle between the X-axis and the diffraction direction of incident light by the first and fourth pattern regions A and D is greater than the absolute angle between the X-axis and the diffraction direction of incident light by the second and third pattern regions B and C and the respective absolute angles have appropriate values, the amount of offset increased in the bisectional light receiving regions B1/B2 and D1/D2 can be made smaller than the amount of offset decreased in the bisectional light receiving regions A1/A2 and C1/C2. Thus, when the diffraction angle is changed, the offset is reduced.

Also, if the wavelength decreases compared to that during the adjustment for the assembly of an optical element, a phenomenon opposite to the phenomenon occurs.

As a result, an offset of the focus error signal generated according to a change in the wavelength of the light emitted from the light source can almost be removed by employing the hologram element 10 and the photodetector 30 according to the present invention.

In the case where the optical pickup device performs reproduction of the recording medium, the signal operation unit 50 detects information signal RFS by summing detection signals of the first through fourth light receiving units. Here, the information signal RFS is detected by summing the detection signals a, b, c and d of the single light receiving regions A, B, C and D of the first and second light receiving units and the detection signals e1+e2 and f1+f2 of the single light receiving regions E1+E2 and F1+F2 of the third and fourth light receiving units, as represented by the formula (8):

$$RFS=a+b+c+d+e1+e2+f1+f2 \qquad (8)$$

where the information signal RFS may be detected by summing the detection signals of the light receiving regions E1+E2 and F1+F2 and the detection signals of the bisectional light receiving regions or by summing all detection signals.

In the above-described signal detection unit according to the present invention, it has been described and illustrated that the first and second pattern portions of the hologram element 10 consist of each two pattern regions. However, the first and second pattern portions may consist of each single pattern regions and corresponding light receiving regions of a photodetector and a signal operation unit may be provided, which can be easily inferred from the above description and a detailed explanation will be omitted.

Now, a preferred embodiment of an optical pickup device adopting the signal detection unit according to the present invention will be described with reference to FIG. 8.

Referring to the drawing, the optical pickup device includes a light source 101, light path changing means 103 for changing the traveling path of incident light, focusing means 110 such as an objective lens for condensing the incident light from the light path changing means 103 onto a recording medium 100a, and a signal detection unit 120 for detecting an information signal of the recording medium 100a and/or an error signal. Also, a collimating lens 107 for collimating divergent light emitted from the light source 101 may be further provided between the light path changing means 103 and the focusing means 110.

The light source 101 emits light of a wavelength λ1 suitable for recording and/or reproduction of the recording medium 100a which is relatively thin, for example, a DVD family disk, and the emitted light is condensed onto the recording medium 100a by the focusing means 110 via the light path changing means 103.

FIG. 8 illustrates a polarizing beam splitter for transmitting and reflecting the light incident into the light path changing means 103 according to the polarization direction. In this case, a wave plate 109 for changing polarization of incident light may be further provided between the polarizing beam splitter and the focusing means 110. Here, the wave plate 109 is preferably a quarter wave plate with respect to the wavelength of the light emitted from the light source 101. In the case where the light source 101 emits beams having different wavelengths for recording and reproduction, the wave plate 109 is preferably a quarter wave plate with respect to the wavelength of the light for reproduction.

In this embodiment, the polarizing beam splitter transmits a linearly polarized light component incident from the light source 101 to be directed to the recording medium 100a and reflects the other linearly polarized light component which is orthogonal thereto. Thus, the linearly polarized light which has transmitted through the polarizing beam splitter is changed into a circularly polarized light by the quarter wave plate and reflected by the polarizing beam splitter to then be incident into the signal detection unit 120.

Also, the collimating lens 107 is disposed between the polarizing beam splitter and the focusing means 110 to make converged light incident into the signal detection unit 120. In this case, the collimating lens 107 functions as a light sensing lens. Here, the collimating lens 107 may be disposed between the light source 102 and the polarizing beam splitter and a light sensing lens (not shown) for converging incident light may be separately provided between the polarizing beam splitter and the signal detection unit 120.

The signal detection unit 120 includes a hologram element 10, a focus adjusting lens 25 and a photodetector 30, which are substantially the same as those illustrated in FIGS. 2 through 7.

In the optical pickup device according to the present invention, during recording and/or reproduction of the relatively thin disk type recording medium 100a, the light reflected and incident from the recording medium 100a by the hologram element 10 having at least six pattern regions is diffracted and/or converged, as shown in FIG. 3, and the diffracted light is detected by the photodetector 30 having a plurality of light receiving regions for receiving the light diffracted by the respective pattern regions, as shown in FIG. 4. Thus, an error signal can be accurately detected. In other words, even when the photodetector 30 is deviated or the focusing means 110 such as an objective lens is shifted, or even when the wavelengths of light emitted from a light source of the optical pickup device are changed due to a recording mode or a change in the temperature, a stable focus and track error signals having minimized offset can be detected.

Referring back to FIG. 8, the optical pickup device according to the present invention preferably further includes a light module 131 for emitting light of a wavelength λ2 suitable for recording and/or reproduction of the recording medium 100b which is relatively thick, for example, a CD family disk, and for receiving light reflected from the recording medium 100b, and focusing means 140 for changing a traveling path of the light emitted from the light module 131, thereby compatibly adopting recording media having different thicknesses.

The light module 131 includes a light source (not shown), a hologram (not shown) for making most of the incident light from the light source travel straightly and diffracting +1st-order and/or −1st-order incident light after being reflected from the relatively thick disk type recording medium 100b, for example, a CD family disk, and a photodetector (not shown) disposed at one side of the light source, for receiving the incident light after being diffracted by the hologram to detect an information signal and/or error signal. Here, the structure of the light module 131 is widely known and a detailed description thereof will be omitted.

Instead of the light module 131, there may be included a light source 101, a beam splitter (not shown) disposed between the light source 101 and the light path changing means 140, and the signal detection unit 120.

In order to minimize loss of light for recording and/or reproduction of the relatively thin disk type recording medium 100a, the light path changing means 140 preferably includes a dichroic filter for transmitting most of light of a wavelength λ1 emitted from the light source 101 and reflecting light of a wavelength λ2 emitted from the light module 131. Here, reference numeral 137 denotes a focusing lens disposed along the light path between the light module 131 and the dichroic filter.

For compatible use with recording media having different thicknesses, it is preferable that means for adjusting the aperture of light incident into the focusing means 110 is provided. FIG. 8 illustrates an aperture filter 115 provided as the aperture adjusting means, such as a liquid crystal shutter for adjusting the size of a transmitted beam of incident light according to the thickness of the recording medium for recording and/or reproduction. Here, reference numeral 108 denotes a mirror for reflecting incident light and changing a traveling path thereof.

The above-described optical pickup device according to the present invention can detect focus and track error signals without offsets during recording and/or reproduction of a relatively thin disk type recording medium, thereby enabling a stable servo operation.

Although it has been described that the signal detection unit according to the present invention, which is employed in an optical pickup device shown in FIG. 8, detects focus and track error signals in a stable manner, the signal detection unit can be employed to various optical pickup devices within the scope of the present invention.

The above-described signal detection unit according to the present invention includes a hologram element having four pattern regions for diffracting and focusing incident light and at least two pattern regions for diffracting incident light and a photodetector provided to correspond to the hologram element, thereby detecting a stable focus error signal having reduced offsets even at deviations of the photodetector and a change in the wavelength of light emitted from a light source.

Also, the signal detection unit according to the present invention can detect a push-pull signal without offset even when focusing means such as an objective lens is shifted.

In particular, since the signal detection unit according to the present invention detects a focus error signal by employing a hologram element having a plurality of pattern regions for diffracting incident light and focusing the same onto different focuses and a photodetector having bisectional light receiving regions for receiving the diffracted beams, instead of an astigmatic method, crosstalk due to the effect of grooves on the focus error signal does not occur severely even in the case of recording/reproducing a disk type recording medium for high-density recording and/or reproduction, that is, a land/groove recording type.

Therefore, the optical pickup device adopting the above-described signal detection unit according to the present invention can realize a stable servo operation and high-density recording and/or reproduction.

What is claimed is:

1. An optical pickup device comprising:

a first light source for generating and emitting light;

first light path changing means for changing a traveling path of incident light;

focusing means for focusing the incident light from the light path changing means onto a recording medium; and a first signal detection unit having a hologram element for diffracting incident light after being reflected from the recording medium, a photodetector for receiving the light diffracted by the hologram element and converting the same into an electrical signal and a signal operation unit for generating a focus error signal and/or a track error signal from a detection signal of the photodetector, the signal detection unit for receiving the light reflected from the recording medium and then passed through the focusing means and the first light path changing means, wherein the hologram element includes first and second pattern portions arranged to be spaced apart a predetermined distance from each other, for diffracting and focusing incident light, and third and fourth pattern portions arranged close to the first and second pattern portions, respectively, for diffracting incident light in different directions, the first and second pattern portions being provided such that ±1st-order diffracted beams are focused on first and second focuses, respectively, and wherein the photodetector includes first and second light receiving units positioned between the first and second focuses in an on-focus state, for receiving the light diffracted and focused by the first and second pattern portions, and third and fourth light receiving units for receiving the light diffracted by the third and fourth pattern portions.

2. The optical pickup device according to claim 1, wherein the first pattern portion includes first and second pattern regions, the second pattern portion includes third and fourth pattern regions facing the first and second pattern regions, respectively, one diffracted beam among ±1st-order diffracted beams diffracted by the first and fourth pattern regions is focused on the first focus and the other diffracted beam is focused on the second focus, and one diffracted beam among ±1st-order diffracted beams diffracted by the second and third pattern regions is focused on the second focus and the other diffracted beam is focused on the first focus.

3. The optical pickup device according to claim 2, wherein the first light receiving unit includes first and second sectional light receiving regions each of which forms a bisectional light receiving region for receiving one diffracted beam among the ±1st-order diffracted beams diffracted by the first pattern region, and third and fourth sectional light receiving regions each of which forms a bisectional light receiving region for receiving one diffracted beam among the ±1st-order diffracted beams diffracted by the second pattern region; and the second light receiving unit includes fifth and sixth sectional light receiving regions each of which forms a bisectional light receiving region for receiving one diffracted beam among the ±1st-order diffracted beams diffracted by the third pattern region, and seventh and eighth sectional light receiving regions each of which forms a bisectional light receiving region for receiving one diffracted beam among the ±1st-order diffracted beams diffracted by the fourth pattern region.

4. The optical pickup device according to claim 3, wherein the signal operation unit detects a focus error signal by obtaining a difference between the sum signal of detection signals of the first, third, fifth and seventh sectional light receiving regions and the sum signal of detection signals of the second, fourth, sixth and eighth sectional light receiving regions.

5. The optical pickup device according to claim 3, wherein the bisectional light receiving regions are sectioned substantially parallel to each other, and the second and eighth sectional light receiving regions and fifth and third sectional light receiving regions are disposed inward with respect to the first and seventh sectional light receiving regions and the sixth and fourth sectional light receiving regions, respectively.

6. The optical pickup device according to claim 5, wherein the signal operation unit detects a focus error signal by obtaining a difference between the sum signal of detection signals of the first, third, fifth and seventh sectional light receiving regions and the sum signal of detection signals of the second, fourth, sixth and eighth sectional light receiving regions.

7. The optical pickup device according to claim 3, wherein the first light receiving unit further comprises first and second single light receiving regions for receiving another diffracted beams diffracted by the first and second pattern regions, and the second light receiving unit further comprises third and fourth single light receiving regions for receiving another diffracted beams diffracted by the third and fourth pattern regions.

8. The optical pickup device according to claim 2, wherein the first light receiving unit includes first and second sectional light receiving regions each of which forms a bisectional light receiving region for receiving one diffracted beam among the ±1st-order diffracted beams diffracted by the first pattern portion, and the second first light receiving unit includes third and fourth sectional light receiving regions each of which forms a bisectional light receiving region for receiving one diffracted beam among the ±1st-order diffracted beams diffracted by the second pattern portion.

9. The optical pickup device according to claim 8, wherein the signal operation unit detects a focus error signal by obtaining a difference between the sum signal of detection signals of the first and third sectional light receiving regions and the sum signal of detection signals of the second and fourth sectional light receiving regions.

10. The optical pickup device according to claim 8, wherein the bisectional light receiving regions are sectioned substantially parallel to each other, and the second and third sectional light receiving regions are disposed between the first and fourth sectional light receiving regions.

11. The optical pickup device according to claim 10, wherein the signal operation unit detects a focus error signal by obtaining a difference between the sum signal of detection signals of the first and third sectional light receiving regions and the sum signal of detection signals of the second and fourth sectional light receiving regions.

12. The optical pickup device according to claim 8, wherein the first and second light receiving units further comprises single light receiving regions for receiving another diffracted beams diffracted by the first and second pattern portions, respectively.

13. The optical pickup device according to claim 1, wherein the third and fourth pattern portions are provided between and/or outside the first and second pattern portions.

14. The optical pickup device according to claim 13, wherein the distance between the first and second pattern portions and the respective widths thereof are optimized to suppress the generation of offsets in a track error signal with respect to movement of the focusing means.

15. The optical pickup device according to claim 1, wherein the distance between the first and second pattern portions and the respective widths thereof are optimized to suppress the generation of offsets in a track error signal with respect to movement of focusing means.

16. The optical pickup device according to claim 1, wherein the signal operation unit selectively detects a push-pull signal or a differential phase signal according to a recording/reproduction mode or types of recording media.

17. The optical pickup device according to claim 1, wherein in order to detect a push-pull signal without a direct-current (DC) component offset, the signal operation unit comprises:
- a first differential unit for obtaining the difference between the detection signals of the first and second light receiving units;
- a second differential unit for obtaining the difference between the detection signals of the third and fourth light receiving units;
- first and second amplifiers for amplifying output signals of the first and second differential units into predetermined gain levels; and
- a third differential unit for obtaining the difference between the signals input from the first and second amplifiers, wherein the gains of the first and second amplifiers satisfy the condition of the DC component offset in the differential signal of the third differential unit being removed.

18. The optical pickup device according to claim 1, wherein the first light source emits light in a first wavelength region suitable for recording and/or reproduction of a relatively thin recording medium, and wherein the optical pickup device further includes a second light source for emitting light in a second wavelength region suitable for recording and/or reproduction of a relatively thick recording medium, and second light path changing means disposed along the light path between the first light source and the focusing means, for changing a traveling path of the light emitted from the second light source, thereby compatibly adopting disks having different thicknesses.

19. The optical pickup device according to claim 18, wherein the second light path changing means is a dichroic filter for transmitting light in the first wavelength region and reflecting light in the second wavelength region, and wherein the optical pickup further includes a second signal detection unit for receiving light emitted from the second light source and reflected from the recording medium, for detecting an information signal and/or an error signal during recording and/or reproduction of a relatively thick disk.

* * * * *